Feb. 19, 1957 J. S. BAER ET AL 2,781,973

PUNCHED TAG READER

Filed Oct. 24, 1955 2 Sheets-Sheet 1

INVENTORS.
John S. Baer &
Robert A. Oberdorf
BY Morris L. Rabkin
ATTORNEY.

INVENTORS.
John S. Baer &
Robert A. Oberdorf
BY
Morris L. Lakin
ATTORNEY.

United States Patent Office 2,781,973

Patented Feb. 19, 1957

2,781,973

PUNCHED TAG READER

John S. Baer, Woodbury, and Robert A. Oberdorf, Delaware Township, Camden County, N. J., assignors to Radio Corporation of America, a corporation of Delaware Application October 24, 1955, Serial No. 542,352

3 Claims. (Cl. 235—61.11)

This invention relates to a device for sensing and transporting punched cards, especially punched tags such as may be used as merchandise tags.

In the area of inventory control, for example, each item of inventory may be assigned an inventory number and a unit price which, together with such additional information as style, color, and size, may be encoded and placed on a small garment tag as a coded group of punched holes. The binary code enables the punched holes to convey the desired information. These holes can be sensed by electronic machines and the encoded information utilized in such machines in known manner.

In retail merchandising applications, the conventional Hollerith-type punched card is considered too large for use as a garment tag. Accordingly, smaller tags have been designed and are in general use. Card readers of the prior art designed primarily for the larger Hollerith-type cards are not easily adapted to read the small merchandise tags. Further, card readers are of generally complex construction and are expensive to construct and maintain.

It is an object of the present invention to provide a tag reader which is small and contains few moving parts.

It is a further object of the invention to provide an improved tag reader of the type which is especially adapted to sequentially sense and advance a small punched tag.

An additional object of the invention is to provide a tag reader that is more simply constructed and maintained and is less costly than the tag readers of the prior art.

In accordance with the present invention, a punched tag is placed in a tag sensing and transporting device. A drive shaft containing a cam and a single-tooth pinion is rotated. As the drive shaft revolves, the single-tooth pinion engages a Geneva gear, advancing the gear by one tooth. The Geneva gear is held against further movement by the pinion until the next revolution. A drive sprocket, connected by intermediate gears to the Geneva gear, coacts with sprocket holes in the punched tag to advance the tag by an incremental amount. During the remainder of the revolution of the drive shaft, the cam cooperates with sensing arms to detect the presence or absence of perforations in the tag. Signal means associated with each sensing arm provide a signal when perforations are detected. Successive cycles repeat the advancing and sensing steps.

These and other features of the invention may be best understood from the following disclosure when read in connection with the accompanying drawing.

Figure 1:
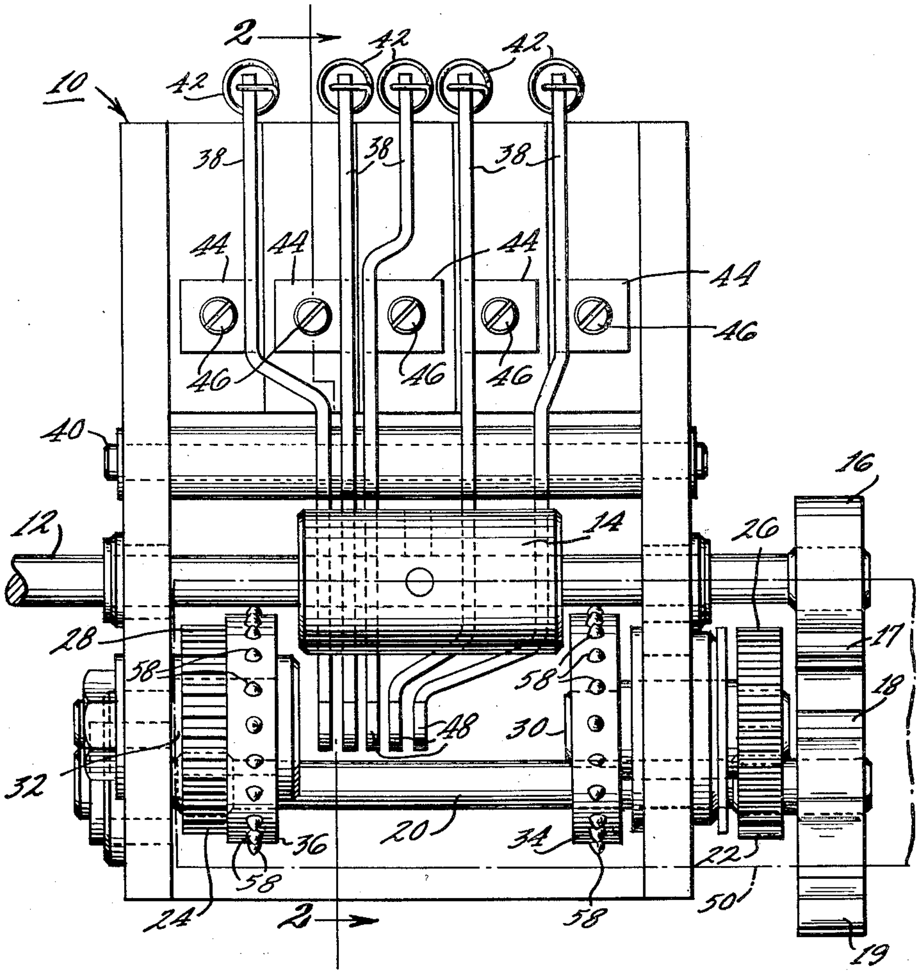
Fig. 1 is a top view of a tag reader in accordance with the present invention taken along line 1—1 of Fig. 2.
Figures 2, 3:
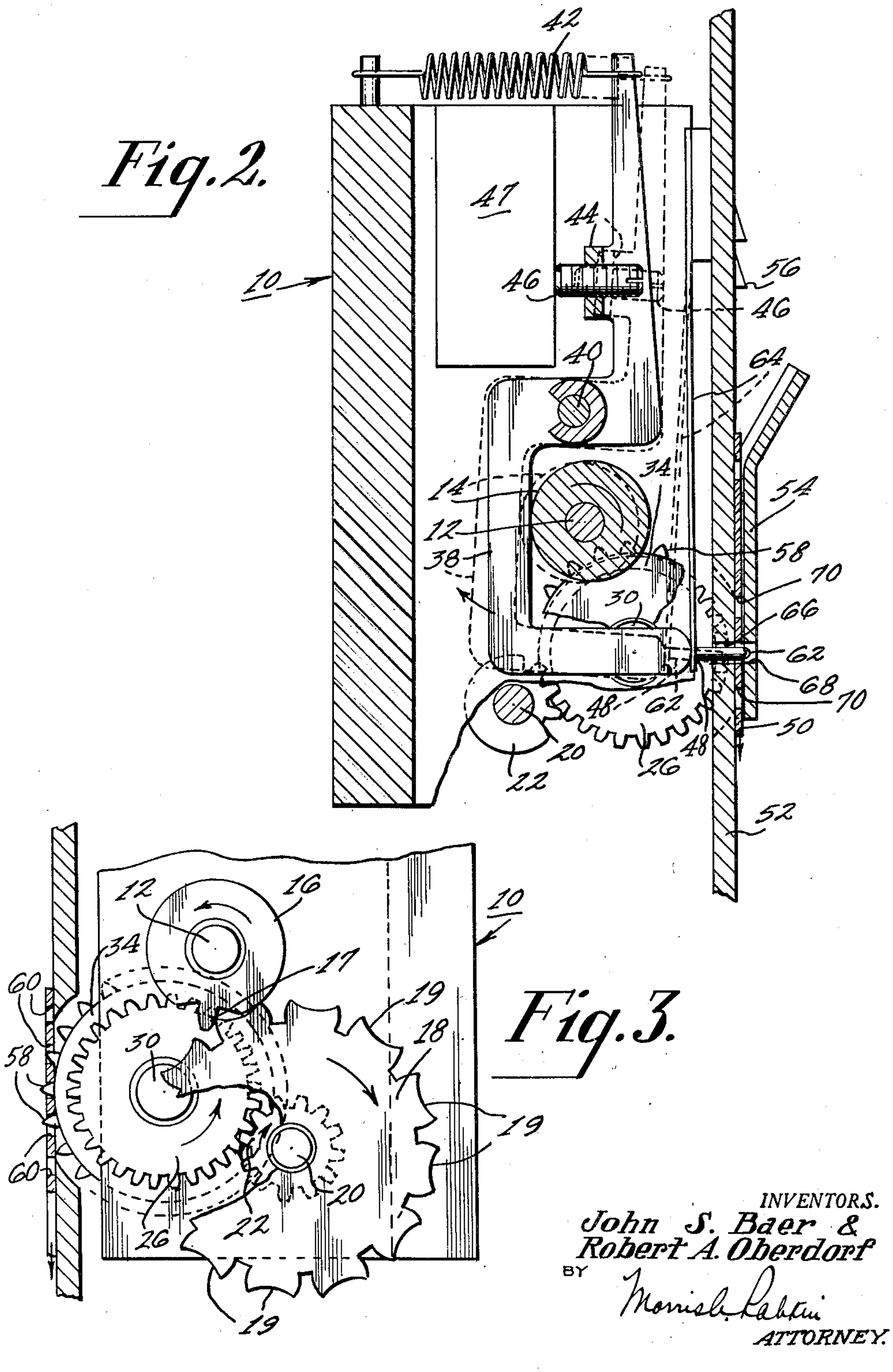
Fig. 2 is a sectional side view of the tag reader of Fig. 1 along line 2—2.
Fig. 3 is a side view of the drive mechanism of the tag reader taken along line 3—3 of Fig. 1.

Referring now to Figs. 1, 2, and 3, one embodiment of the invention is shown consisting of a base structure 10 upon which is mounted the operating mechanism. A drive shaft 12 is connected to a source of rotary motion not shown here. Mounted upon the drive shaft 12 and rotating therewith is a sensing cam 14 and a single-toothed drive pinion 16. Drive pinion 16 is of circular shape, a single tooth 17 extending radially from the periphery thereof. A Geneva gear 18, having concave arcuate teeth 19 is positioned to receive the tooth 17 of pinion 16 between teeth 19 and to engage the circular periphery of the pinion 16 in the concavity of that Geneva gear tooth 19 just advanced by the action of pinion tooth 17.

Geneva gear 18 is mounted on an advancing shaft 20 containing advancing pinions 22 and 24. Pinion 22 engages an advancing gear 26 which is coupled to sprocket shaft 30 upon which shaft is mounted advancing sprocket 34. Similarly, pinion 24 coacts with advancing gear 28 which is connected to sprocket shaft 32 upon which is mounted advancing sprocket 36.

Cooperating with sensing cam 14 are a plurality of sensing arms 38, pivotally mounted on pivot shaft 40 and biased in a counter-clockwise direction, as seen in Fig. 2, each by a biasing spring 42 fastened to one end. Each sensing arm 38 has a switch contact plate 44 in which a switch contact 46 is mounted. A plurality of switches 47 are mounted on the base structure and positioned to coact one with each switch contact plate 44. The other or free end of each sensing cam 38 terminates in a sensing pin contacting surface 48 and is so positioned to transmit a reciprocal motion to an associated sensing pin 62.

Referring now to Fig. 2, a punched tag or card 50 may be placed on a guide surface 52 under a guide plate 54 and adjacent guide pins or studs 56. The card 50 contains a column of sprocket holes 60 to be engaged by sprocket pins 58.

The card sensing mechanism comprises a plurality of card sensing pins 62 each of which is mounted on a flexible pin support 64 and placed on the underside of the guide surface 52. Sensing pin 62 is free to move through sensing holes 66 and 68 in the guide surface 52 and guide plate 54, respectively.

Figure 4:
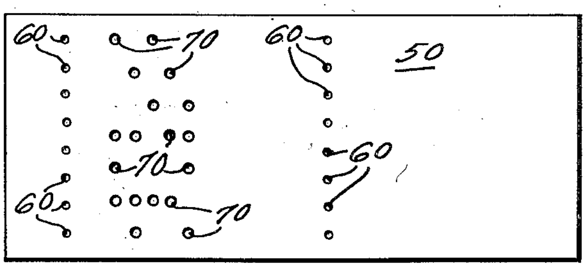
Fig. 4 is a sketch of a card or tag suitable for use in a tag reader in accordance with the present invention.

A punched card suitable for use in a device made in accordance with the present invention is shown in Fig. 4. A substantially rectangular tag contains sprocket holes 60 and a plurality of columns containing perforations 70. Each row of preforations 70 is associated with a particular pair of sprocket holes 60, and a different alphabetic or numeric character may be associated with each combination of one or more perforations 70 in each row.

In operation, a punched tag 50 is placed on guide surface 52 and beneath tag guide 54. The sprocket pins 58 are arrayed so that at least three of them are in engagement with the corresponding sprocket holes 60 of the tag 50 during the sensing process. The drive shaft 12 is rotated through one revolution during which the sensing cam 14 moves sensing arms 38 down and out of engagement with sensing pins 62. Pin supports 64 have sufficient resiliency to maintain the pins in a withdrawn position relative to holes 66 and 68. At those portions of the cycle when the tooth 17 of pinion 16 is not in engagement with Geneva gear 18, the periphery of pinion 16 fits into the arcuate concavity of a Geneva gear tooth 19, holding the Geneva gear 18 against movement and therefore holding the tag 50 in alignment during the cycle. Engagement of the pinion tooth 17 imparts an increment of angular motion to the Geneva gear 18 which when transmitted to the advancing sprockets 34 and 36 advances the tag 50, by an increment equal to the distance between sprocket holes 60. Successive revolutions of the drive shaft 12 incrementally advances tag 50 until the first row of punched information holes is aligned with the sensing holes 66 and 68. During each cycle, the rotation of the sensing cam 14 permits the sensing arms 38 to come upwards urged by the bias springs 42. If there are perforations 70 at the sensing position, the force of each biasing spring 42 on the associated sensing arm 38 moves the pin engaging surface 48 upwards pushing the corresponding sensing pin 62 through hole 66, the car perforation 70 and hole 68. When sensing arm 38 is in this extreme upward position, the switch contact 46 closes the contact of switch 47 providing an electrical impulse. As the sensing cam 14 continues the cycle, sensing arm 38 is cammed downward. Sensing pins 62 are withdrawn under the influence of resilient pin support 64 from the perforations 70 in tag 50. As long as the drive shaft is energized, the drive pinion 16 rotates, engaging Geneva gear 18 and incrementally advancing tag 50 to the next position.

The tag 50 has sufficient rigidity to hold those sensing pins 62 against the force of spring 42 against the associated arm 38 should no perforation be present in that position. In such a case, the movement of arm 38 would not be sufficient for switch contact plate 46 to activate the associated switch 47.

Succeeding rows of coded perforation may be sensed during successive cycles. Sprocket holes 60 extend over the width of the card 50 so that in the inserted position, at least one pair of sprocket holes 60 is in engagement with sprocket pins 58. The tag 50 advances during succeeding cycles and is pushed out of engagement with the sprockets 34, 36 when the last pair of holes 60 are engaged and the following pins 58 push against the edge of the tag 50.

Each revolution of the drive shaft completes one cycle of operation during which a tag is advanced, sensing pins are released to read the card, a signal is generated and the pins are withdrawn.

Thus there has been shown an improved tag sensing and advancing mechanism which is of simple construction and operation and contains few moving parts.

What is claimed is:

1. A tag reader comprising a base structure, means providing a tag support surface attached to said base structure and having apertures to receive sensing pins, a tag guide member attached to said means and having apertures in alignment with said tag support surface apertures to receive sensing pins, a plurality of flexible arms each having one end fixed with respect to said support surface means, a plurality of sensing pins respectively each on a separate one of said flexible arms at the other end thereof, said pins being normally positioned to be disengaged from said sensing pin apertures, a pivot in said base structure, a plurality of sensing arms pivotally mounted on said pivot, each of said sensing arms having at one end a substantially L-shaped portion positioned to move said other end of a different one of said flexible arms, each of said sensing arms being yieldingly biased at its other end to push said flexible arms to urge said sensing pins into said apertures, a purality of contact plates each attached to a separate one of said sensing arms between said pivot and said biased ends, signal switches attached to said base structure and positioned to be closed respectively by said contact plates when said pins are fully advanced, a drive shaft mounted on the said base structure, a cam to be driven by said shaft and positioned to cam said sensing arms out of engagement with said flexible arms, a pinion fixed to said drive shaft, a Geneva gear having a plurality of concave, arcuate teeth to coact with said pinion, an advancing shaft, an advancing pinion mounted thereon, said Geneva gear being mounted on said advancing shaft coaxially with said advancing pinion, and advancing means cooperating with said advancing pinion, said advancing means including sprocket means adapted to engage a tag to be read and to advance said tag by incremental amounts when said sensing arms are cammed out of engagement with said flexible arms.

2. A tag reader comprising a base means, a sensing means, and an advancing means; said base means including a base portion, means adapted to support for reading a tag having sprocket holes and coded apertures to receive sensing pins, guide means fixed to said support means and having sensing pin apertures with which said tag apertures may be aligned; said sensing means comprising a plurality of flexible support arms each fixed at one end with respect to said support means, a plurality of sensing pins each carried on the other end of a separate one of said flexible support arms, each of said pins being positioned to cooperate with a different one of said apertures and normally being disengaged from said apertures, a pivot fixed on said base portion, a plurality of sensing arms mounted on said pivot, each of said arms being adapted at one end to coact with the said other end of a different one of the said pin-carrying flexible arms and yieldingly biased at the other end to move the associated flexible arm to urge the pin carried thereby into the associated one of said apertures, separate signalling means attached one to each of said sensing arms for providing a signal when any one of said sensing arms has fully advanced one of said flexible arms and the pin associated therewith; and said advancing means comprising a drive shaft attached to said base portion, a sensing cam eccentrically mounted on said shaft and positioned to cam said sensing arms out of contact with said pin-carrying flexible arms, a drive pinion fixed to said shaft, Geneva gear means for cooperating with said drive pinion to impart incremental rotation to said Geneva gear means, and advancing gear means coupled to said Geneva gear means and including sprocket means for incrementally advancing said tag when said sensing pins are disengaged from said apertures.

3. A device for reading a tag comprising a base portion, means to support for reading a tag having apertures and sprocket holes, guide means adjacent said support means, said support means and said guide means both also having apertures with which said tag apertures may be aligned, a plurality of sensing pins each positioned to engage a separate one of said apertures, flexible arms each fixedly mounted relative to said support means and each adapted to carry a different one of said pins, said arms being normally positioned to disengage said pins from said apertures, a plurality of sensing arms pivotally mounted on said base portion each adapted at one end to coact with a different pin-carrying flexible arm and biased at the other end to move its associated flexible arm to urge the pin thereof into the associated ones of said apertures, a plurality of signal means each positioned to be actuated by a different one of said sensing arms when the associated flexible arm has urged its said pin fully into the associated apertures, a drive shaft mounted in said base portion and adapted at one end to receive a rotary motion, a sensing cam eccentrically mounted on said shaft to cam said sensing arms out of engagement with said pin-carrying flexible arms, a single toothed pinion mounted at the other end of said drive shaft, a Geneva gear cooperatively engaged with said single toothed pinion, said drive shaft being adapted to supply an increment of angular rotation to said Geneva gear with each revolution of said drive shaft, and advancing means, including a sprocket wheel coupled to said Geneva gear, for transmitting intermittent motion to said tag when said sensing pins are disengaged from said apertures.

No references cited.